J. KOPPMANN.
COOKER.
APPLICATION FILED OCT. 21, 1910.
1,038,393.
Patented Sept. 10, 1912.
2 SHEETS—SHEET 2.
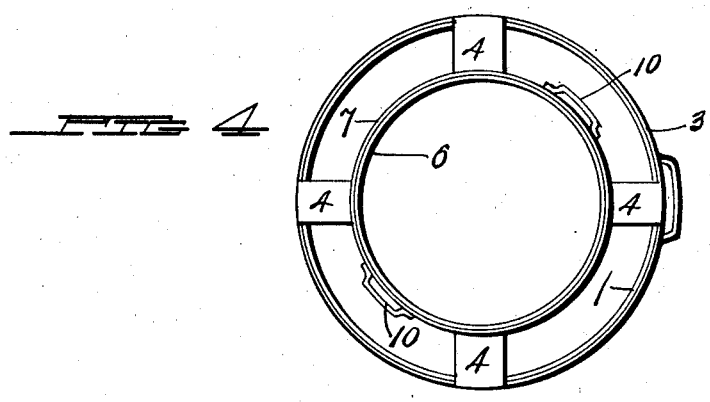
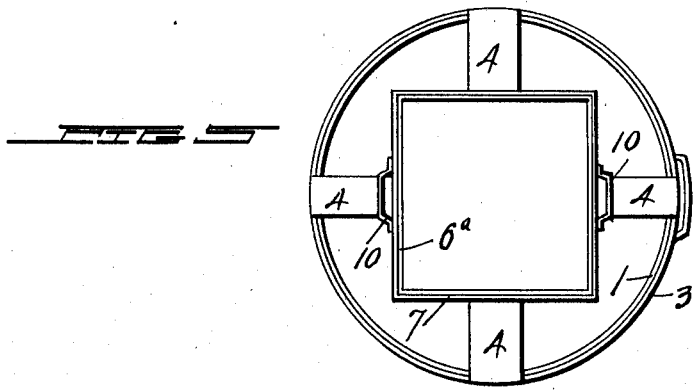
Witnesses
Robert Plowz
Eli Harris
Inventor
Julia Koppmann
By Chas. N. LaPorte
atty

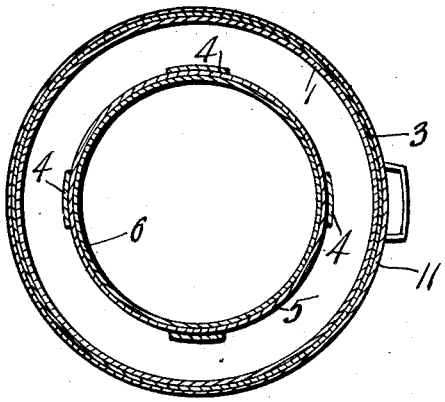
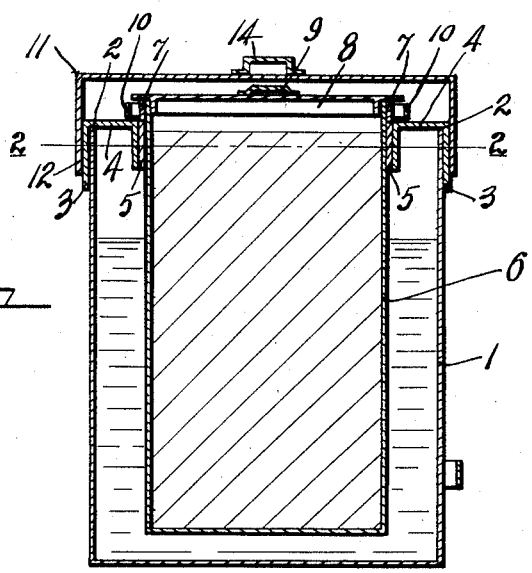
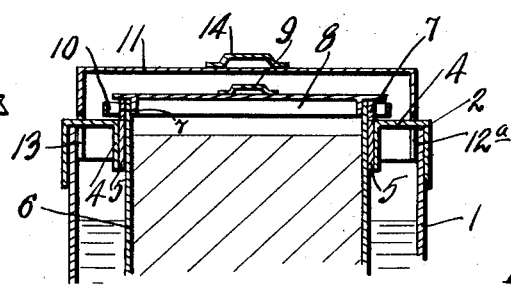

UNITED STATES PATENT OFFICE.

JULIA KOPPMANN, OF GROVELAND TOWNSHIP, TAZEWELL COUNTY, ILLINOIS.

COOKER.

1,038,393.  Specification of Letters Patent.  Patented Sept. 10, 1912.

Application filed October 21, 1910. Serial No. 588,386.

*To all whom it may concern:*

Be it known that I, JULIA KOPPMANN, a citizen of the United States, residing in Groveland township, in the county of Tazewell and State of Illinois, have invented certain new and useful Improvements in Cookers, of which the following is a specification.

This invention has reference to an improved construction for cookers or double boilers, and has for one of its objects to provide a boiler the various structural parts of which may be easily and quickly detached for convenience in handling the utensil both when in use for cooking and when being cleaned.

A further object of the invention is to provide a convenient means for supplying the same cooker with various different shapes of interior vessels, particularly when said interior vessels are being used as pudding molds.

A still further object of the invention is a structure that simplifies the manner of removing the pudding from the mold when the interior vessel is used as such.

For a more complete and thorough understanding of the invention reference is had to the accompanying drawings, in which,—

Figure 1 is a vertical section through the center of my improved double boiler, with the parts in position as they will be when cooking a pudding; Fig. 2 is a horizontal section as the same would appear on the line 2—2 of Fig. 1; Fig. 3 is a partial sectional view similar to Fig. 1 showing a modified form of cover; Fig. 4 is a top plan view of the cooker as shown in Fig. 1, but with the covers removed, and Fig. 5 is a view similar to Fig. 4, but showing a square instead of a circular pudding mold.

Like characters of reference indicate corresponding parts throughout the figures.

In the drawings 1 refers to the exterior vessel of the double boiler, said vessel being preferably cylindrical in form, the upper end of said vessel being entirely open and having the upper edge 2. A ring shaped band 3 is adapted to fit snugly around the outside of the upper edge 2 but is freely detachable therefrom. Said ring 3 has extending radially inward therefrom and preferably formed integrally therewith a plurality of arms or bands 4, said arms arranged to rest on the upper edge 2 of the exterior vessel 1, and thereby hold the ring shaped band 3 adjacent said upper edge 2. Suitably secured to the inner ends of said radial arms 4 and arranged to be supported thereby is the interior supporting band 5. Thus is formed a supporting frame for the interior vessel 6 which is preferably a pudding mold. Said vessel 6 has around the outside of the upper edge thereof the band 7 which is arranged to rest on the band 5 of the supporting frame and thereby hold said vessel 6 freely suspended in the interior of the vessel 1. Said vessel or pudding mold may be of any desired shape, and in my invention it is arranged to provide each device with a plurality of different shaped molds, it being, of course, necessary to provide a different shaped supporting frame to correspond to each different shaped mold, such as 6ª in Fig. 5. It is clearly evident that to change the shape of the mold in any utensil it is merely necessary to remove the supporting frame already in place and substitute in lieu thereof the frame of the shape desired, which will support the mold of the intended form.

A cover 8 is provided for the interior vessel 6 which preferably has the finger hold 9. Handles 10 are also provided on the upper edge of the vessel 6 to assist in removing the same from the supporting frame. A cover 11 is also provided for the exterior vessel 1, which cover may either fit snugly around the outside of the band 3 as shown at 12 in Fig. 1, or may fit inside of the upper edge 2 of vessel 1 as shown at 12ª in Fig. 3, in which case it is necessary to have cut out notches 13 in the edge of said cover to allow the same to fit over the arms 4. Said cover is provided with the finger hold 14. Other customary handles and finger holds may be provided as desired.

The advantages of this form of double boiler are seen first, in the ease with which any desired shape of mold may be substituted for that already in use; second, in the convenience with which the interior mold may be taken out to remove the pudding therefrom; third, the possibility of almost completely surrounding the interior vessel with water, which is a very desirable feature in keeping the pudding of the preferred consistency; and fourth, the fact that the parts can be so easily detached from each other for the purposes of thoroughly cleaning the utensil.

What I claim is,—

1. In a device of the character described and in combination, an outer vessel, a supporting frame for suspending an inner vessel within said outer vessel, said supporting frame comprising a depending band adapted to fit and frictionally engage the outside of the upper portion of the wall of said outer vessel and having an inner member in the form of a ring or band with radial connecting strips or arms between said inner member and said depending band, and a vessel suspended from said inner member.

2. In a cooking utensil, a vessel having a vertical wall, a supporting frame comprising an outer ring fitted to said vertical wall, an inner ring and radial connecting strips, a second vessel supported from said inner ring, a cover for said second vessel, a cover for said first mentioned vessel fitted within said vertical wall thereof and having slots or notches to fit over said radial connecting strips.

In testimony whereof I affix my signature, in presence of two witnesses.

JULIA KOPPMANN.

Witnesses:
ROBERT PLOWE,
CHAS. W. LA PORTE.

---

Copies of this patent may be obtained for five cents each, by addressing the "Commissioner of Patents, Washington, D. C."